US010484077B2

(12) United States Patent  
Yoshimura et al.

(10) Patent No.: US 10,484,077 B2  
(45) Date of Patent: Nov. 19, 2019

(54) RELAY APPARATUS AND ITS RELAY METHOD

(71) Applicant: SoftBank Corp., Tokyo (JP)

(72) Inventors: Takayuki Yoshimura, Tokyo (JP); Masahiko Nanri, Tokyo (JP); Masanori Nomachi, Tokyo (JP); Takanori Takii, Tokyo (JP); Jumpei Takagi, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 246 days.

(21) Appl. No.: 15/506,720

(22) PCT Filed: Dec. 14, 2016

(86) PCT No.: PCT/JP2016/087214  
§ 371 (c)(1),  
(2) Date: Feb. 24, 2017

(87) PCT Pub. No.: WO2018/073982  
PCT Pub. Date: Apr. 26, 2018

(65) Prior Publication Data  
US 2019/0089449 A1  Mar. 21, 2019

(30) Foreign Application Priority Data  
Oct. 20, 2016  (JP) .................................. 2016-206129

(51) Int. Cl.  
*H04B 1/60* (2006.01)  
*H04B 7/10* (2017.01)  
*H04B 17/40* (2015.01)

(52) U.S. Cl.  
CPC .............. *H04B 7/10* (2013.01); *H04B 17/40* (2015.01)

(58) Field of Classification Search  
CPC .................................. H04B 7/10; H04B 17/40  
(Continued)

(56) References Cited

U.S. PATENT DOCUMENTS

2011/0249763 A1* 10/2011 Tosato ................. H04B 7/0626  
375/260  
2013/0190000 A1* 7/2013 Boudreau ............. H04W 16/26  
455/449

(Continued)

FOREIGN PATENT DOCUMENTS

JP  2015-520996 A  7/2015

OTHER PUBLICATIONS

WIPO, International Search Report for PCT/JP2016/087214, dated Mar. 7, 2017.

*Primary Examiner* — Edward F Urban  
*Assistant Examiner* — Max Mathew

(57) ABSTRACT

Beamforming for radio communication (uplink) from a relay apparatus to a donor base station is performed accurately. A relay apparatus 20 is a relay apparatus 20 for relaying communication between a terminal device 10 and a donor base station 30 and includes: an amplitude and phase measurement unit 25 that measures an amplitude and phase of radio communication from the donor base station 30 to the relay apparatus 20; and a beam adjuster 27 that performs beamforming with respect to the donor base station 30 by adjusting amplitudes and phases from a plurality of antennas used at the relay apparatus 20 by measuring the amplitude and the phase by using the amplitude and phase measurement unit 25, wherein during a time slot when the terminal device 10 does not exist in a service area of the relay apparatus 20, the relay apparatus 20 detects no existence of the terminal device 10 in the service area and stops access radio, the amplitude and phase measurement unit 25 measures the amplitude and the phase, and the beam adjuster 27 performs the beamforming with respect to the donor base station 30, after which the access radio is restarted.

10 Claims, 9 Drawing Sheets

(58) Field of Classification Search
USPC .............................................................. 455/9
See application file for complete search history.

(56) References Cited

U.S. PATENT DOCUMENTS

| | | | |
|---|---|---|---|
| 2013/0310058 A1 | 11/2013 | Ibrahim et al. | |
| 2014/0099881 A1* | 4/2014 | Boudreau | H04B 7/14 |
| | | | 455/7 |
| 2015/0124693 A1* | 5/2015 | Ahn | H04B 7/15564 |
| | | | 370/315 |
| 2015/0380816 A1* | 12/2015 | Tajika | H01Q 1/1271 |
| | | | 370/315 |

* cited by examiner

RELAY APPARATUS AND ITS RELAY METHOD

TECHNICAL FIELD

The present invention relates to a relay apparatus and its relay method for relaying communication between a terminal device and a donor base station.

BACKGROUND ART

Communication standards concerning mobile communications include the third generation mobile phone (3G) standard and the LTE (Long Term Evolution) standard. Various available frequency bands are set for each communication standard and specifications for each frequency band are defined precisely.

Conventionally, a relay apparatus is used to improve coverage when a terminal device is used indoors. Any one of a plurality of frequency bandwidths defined for the communication standards is selected for access radio, which is radio communication between the relay apparatus and the terminal device, and for backhaul radio, which is radio communication between the relay apparatus and a donor base station.

Various techniques that deal with such a relay apparatus are proposed. For example, PTL 1 discloses a technique that performs beamforming of transmission of a signal relating to the backhaul radio by using a plurality of antennas provided on a relay apparatus.

CITATION LIST

Patent Literature

PTL 1: Japanese Unexamined Patent Application Publication (Translation of PCT Application) No. 2015-520996 (claim 24, etc.)

SUMMARY OF THE INVENTION

Technical Problem

However, it was found as a result of verification by the inventors of the present application that even if a frequency bandwidth of the radio communication for the backhaul radio and the frequency bandwidth of the radio communication for the access radio are different from each other, the radio communication for the access radio has more than a small effect on the beamforming for the backhaul radio. Specifically speaking, when an attempt is made to execute the beamforming while the access radio is active at the relay apparatus, a harmonic wave (spurious wave) occurring in the radio communication for the access radio which is performed at close range interferes with the radio communication for the backhaul radio. Therefore, there is a possibility that the beamforming may not be performed accurately.

The present invention was devised in light of the above-described circumstances and it is an object of the invention to propose a relay apparatus and its relay method for accurately performing the beamforming of the radio communication from the relay apparatus to the donor base station.

Solution to Problem

In order to achieve the above-described object, a relay apparatus according to an embodiment of the present invention is a relay apparatus for relaying communication between a terminal device and a donor base station, wherein the relay apparatus includes: an amplitude and phase measurement unit that measures an amplitude and phase of radio communication from a donor base station to the relay apparatus; and a beam adjuster that makes adjustment for beamforming with respect to the donor base station by adjusting amplitudes and phases from a plurality of antennas used at the relay apparatus on the basis of the measured amplitude and phase, wherein the adjustment for the beamforming with respect to the donor base station is performed by measuring the amplitude and the phase during a time slot when a terminal device does not exist in a service area of the relay apparatus.

According to this aspect, the amplitude and phase measurement unit measures the amplitude and phase of the radio communication (downlink) from the donor base station to the relay apparatus during the time slot when the terminal device does not exist in the service area; and, therefore, the amplitude and phase of the downlink is measured accurately. Accordingly, it is known that the plurality of antennas adjusted to have the same amplitude as that of the downlink and an opposite phase of the phase of the downlink can provide radio communication (uplink) of best combined reception quality from the relay apparatus, which uses the same frequency bandwidth, to the donor base station, and it is possible to make the adjustment accurately for the beamforming of the uplink.

The relay apparatus may include a timer for activating the amplitude and phase measurement unit and the beam adjuster and the timer may be set to be activated during a time slot when it is presumed that a terminal device may not exist in the service area of the relay apparatus.

After the activation of the timer, the relay apparatus may: detect that the terminal device does not exist in the service area; and measure the amplitude and the phase after stopping the access radio between the relay apparatus and the terminal device.

The relay apparatus may include a detector that detects whether a terminal device exists in the service area or not; and when the detector detects that the terminal device does not exist in the service area of the relay apparatus for a certain period of time, the relay apparatus may measure the amplitude and the phase and make the adjustment for the beamforming with respect to the donor base station.

After detecting that the terminal device does not exist in the service area for the certain period of time, the relay apparatus may stop the access radio between the relay apparatus and the terminal device and then measure the amplitude and the phase.

The relay apparatus may restart the access radio after making the adjustment for the beamforming.

A relay method for a relay apparatus according to an embodiment of the present invention includes: a step of measuring an amplitude and phase of radio communication from a donor base station to the relay apparatus; and a beam adjustment step of making adjustment for beamforming for radio communication from the relay apparatus to the donor base station by adjusting amplitudes and phases from a plurality of antennas used at the relay apparatus on the basis of the measured amplitude and phase, wherein the relay apparatus makes the adjustment for the beamforming by measuring the amplitude and the phase during a time slot when a terminal device does not exist in a service area of the relay apparatus.

Advantageous Effects of the Invention

According to the present invention, a relay apparatus and its relay method for accurately performing the beamforming for the radio communication from the relay apparatus to the donor base station can be provided.

DESCRIPTION OF EMBODIMENTS

Figure 1:
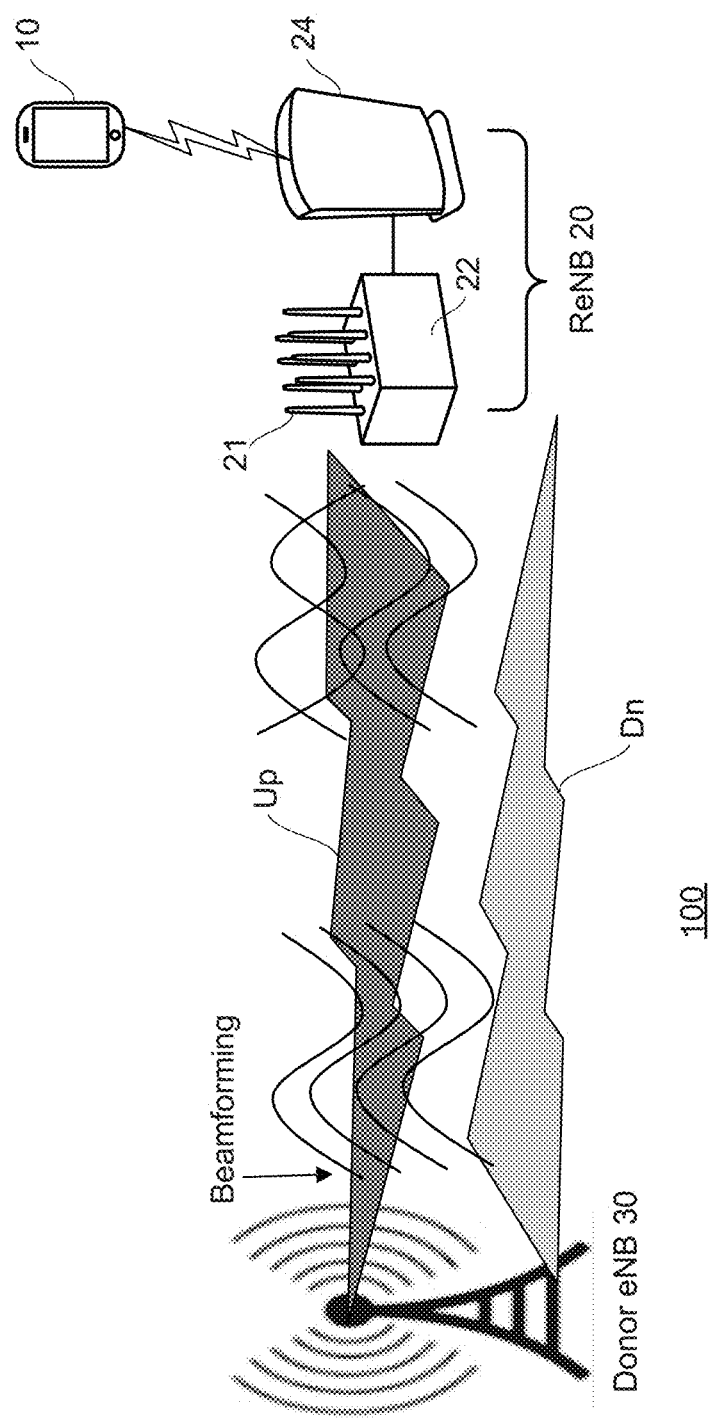
FIG. 1 is an explanatory diagram illustrating a radio network configuration of a mobile communication system.

Preferred embodiments of the present invention will be explained below with reference to the attached drawings. Incidentally, elements to which the same reference numeral is assigned in each drawing have the same or similar configurations.

First Embodiment (Radio Network Configuration)

Firstly, a radio network configuration of a mobile communication system to which a relay apparatus according to a first embodiment is applied will be explained. FIG. 1 is an explanatory diagram illustrating the radio network configuration of the mobile communication system. Referring to FIG. 1, a radio network of a mobile communication system 100 includes a terminal device 10, a relay apparatus 20, and a donor base station 30.

The terminal device 10 is a mobile communication terminal such as a smartphone or a cell phone. FIG. 1 illustrates a state in which access radio is active and the terminal device 10 exists in an available service range of the relay apparatus 20.

The entire relay apparatus 20 is also called a ReNB (Relay Node B) which means a node for relaying communication between the donor base station 30 and the terminal device 10. Specifically speaking, the relay apparatus 20 includes: a relay node 22 that executes radio communication relating to backhaul radio with the donor base station 30; and an access node 24 that executes radio communication relating to access radio with the terminal device 10. Referring to FIG. 1, the relay node 22 and the access node 24 are configured as independent separate devices, but they may be configured as an integrated device in which the functions of both nodes are consolidated. The relay node 22 and the access node 24 handle packet data as radio signals. Packet communication services (such as voice packet communication services and multimedia services) are provided to the terminal device 10 by enabling transmission and reception of the packet data.

The relay node 22 constitutes one node in the radio network and is a node that establishes backhaul radio communication with the donor base station 30. The relay node 22 is also called customer premises equipment CPE (Customer Premises Equipment). The relay node 22 can establish communication with the donor base station 30 by selecting any one of a plurality of frequency bandwidths which are defined as selectable according to the communications standard.

The relay node 22 includes an antenna group 21. The antenna group 21 is an aggregate of a plurality of antenna elements. The relay node 22 is configured to control an amplitude and phase of excitations of each antenna element individually and independently. Directivity regarding a radio signal received by the antenna group 21 can be controlled by a combination of antenna elements used from among the plurality of antenna elements. Accordingly, a signal gain regarding the radio signal from a certain direction can be increased by appropriately selecting the antenna elements to be used.

The access node 24 constitutes one node in the radio network and is a node that establishes access radio communication with the terminal device 10. The access node 24 is also called an HeNB (Home eNode B) or Femtocell (Femto Cell) base station according to the LTE standard. The cell size formed by the access node 24 is of a smaller scale than that of the donor base station 30 and constructs a communication area with a radius ranging from several meters to tens of meters. The cell size of the access node 24 is small as described above, but the relay node 22 is located at a physically very close distance. Therefore, there is a fear that activation of the access radio of the access node 24 may affect execution of beamforming at the relay node 22; and this embodiment provides a method for preventing that.

It is known that when the same frequency is used, a radio signal passes through the same propagation path for the radio communication (downlink Dn) from the donor base station to the relay node 22 and the radio communication (uplink Up) from the relay node 22 to the donor base station. In other words, it is known that when a signal of the same frequency bandwidth is used for the downlink Dn and the uplink Up and if the amplitude and phase of the uplink UP at the relay node 22 are made to be the same amplitude as that of the downlink Dn and an opposite phase of the phase of the downlink Dn, directivity of a radio wave of the downlink Dn and directivity of a radio wave of the uplink Up become similar to each other. Specifically speaking, under the condition that the frequency bandwidth used for the radio communication, the position of the donor base station 30, and the position of the relay node 22 are the same, radio communication of the best combined reception quality can be provided at the donor base station 30 when the amplitude and phase of the uplink Up are made to be the same amplitude as that of the downlink Dn and an opposite phase of the phase of the downlink Dn.

Consequently, if the amplitude and phase of the downlink radio communication are measured and adjustments are made to use the same amplitude as that of the downlink Dn and an opposite phase of the phase of the downlink Dn for the uplink Up, the shape of beam of the radio communication to the donor base station 30 can be adjusted to make the beam focused with respect to the uplink Up and the beam can be transmitted as a strong radio wave to the donor base station 30, that is, preferred beamforming can be executed.

Figure 2:
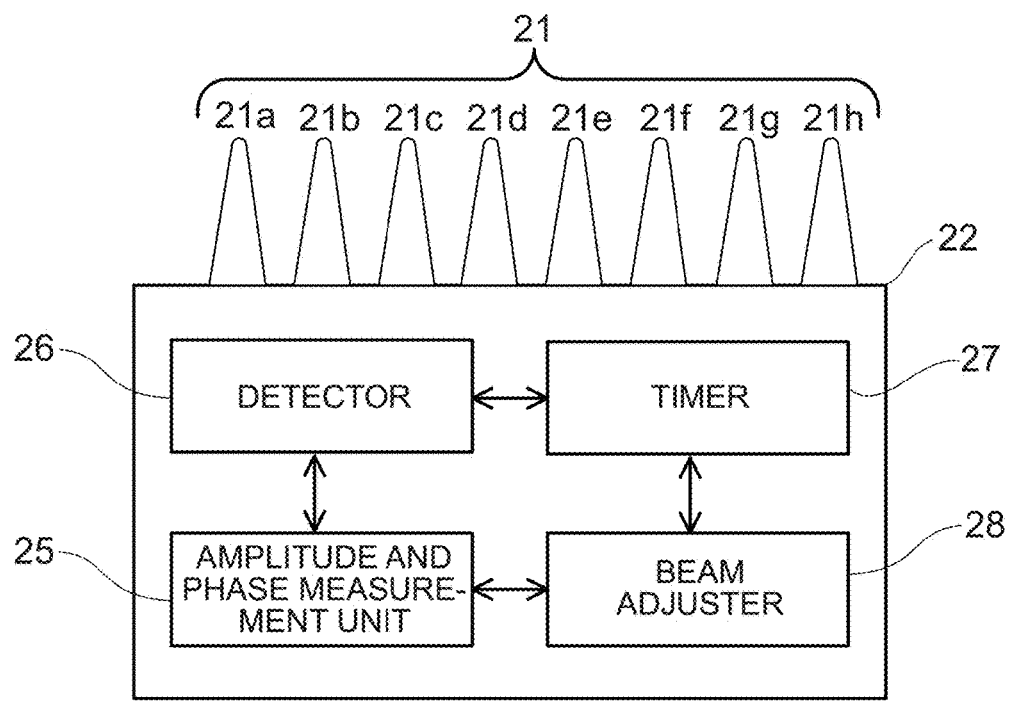
FIG. 2 is a block diagram of a relay apparatus according to a first embodiment.

FIG. 2 is a block diagram of the relay node 22 according to this embodiment. Referring to FIG. 2, the relay node 22 includes: an amplitude and phase measurement unit 25 that measures the amplitude and phase of the radio communication; a detector 26 for detecting that the terminal device 10 does not exist in the service area of the access node 24; a beam adjuster 28 that makes adjustments for the beamforming with respect to the donor base station 30; and a timer 27 that activates the amplitude and phase measurement unit 25 and the beam adjuster 28.

The amplitude and phase measurement unit 25 is an adaptive array for measuring the amplitude and phase of, for example, a radio signal of the downlink Dn.

The detector 26 is a means for: detecting whether the terminal device 10 exists in the service area of the access node 24 or not, upon receiving a query from the timer 27; and returning the detection result to the timer 27.

The timer 27 is a timer means for activating the amplitude and phase measurement unit 25 and the beam adjuster 27 in a time slot during which the terminal device 10 does not exist in the service area of the access node 24 for the relay apparatus 20. Specifically speaking, the timer 27 sends a query to the detector 26 about whether the terminal device 10 exists in the service area of the access node 24 or not, in a time slot which is preset as a time slot during which there is a high possibility that the terminal device 10 may not exist in the service area of the access node 24. Then, once it is confirmed that the detector 26 detects no existence of the terminal device 10 in the service area of the access node 24, the timer 27 stops the access radio by the access node 24 and activates the amplitude and phase measurement unit 25 and the beam adjuster 27. Furthermore, after the adjustments for the beamforming by the amplitude and phase measurement unit 25 and the beam adjuster 27 are completed, the timer 27 restarts the access radio by the access node 24.

Incidentally, the reason why the access radio should preferably be stopped when the amplitude and phase measurement unit 25 measures the amplitude and phase of the downlink Dn is as follows. Factors that influence the measurement of the amplitude and phase of the backhaul radio generally include: (1) the access radio is active (that is, the access node 24 (the femto cell base station) of the relay apparatus 20 is activated and broadcasts a pilot channel and notification information; (2) the terminal device 10 is designed to perform communication via the femto cell base station by referring to this notification information when the terminal device 10 exists in the service area; and (3) voice and data communication is performed via the femto cell base station. If the access radio is stopped, the terminal device 10 can no longer exist in the service area of the access node 24 (the femto cell base station) of the relay apparatus 20 and can no longer use the communication services. Therefore, when measuring the amplitude and phase of the backhaul radio, the access radio should preferably be stopped as in this embodiment in order to ensure accuracy of the measurement result.

The beam adjuster 28 adjusts the amplitudes and phases from the plurality of antenna elements so that such amplitudes and phases become the same amplitude as that of the downlink Dn and an opposite phase of the phase of the downlink Dn measured by the amplitude and phase measurement unit 25, thereby making adjustments for the beamforming to adjust the shapes of beams of the radio communication to the donor base station 30 with respect to the uplink Up, making the beams focused, and transmits them as a strong radio wave to the donor base station 30. The antenna group 21 and the beam adjuster 28 may be designed as, for example, an adaptive array system that performs adaptive control of the directivity characteristics of the antenna group 21. The details will be explained later.

The donor base station 30 is configured to establish the radio communication with the relay node 22 and also directly establish the access radio communication with the terminal device 10. The donor base station 30 constructs a communication area with a radius ranging from hundreds of meters to tens of kilometers.

(Operation of Radio Network)

Figure 3:
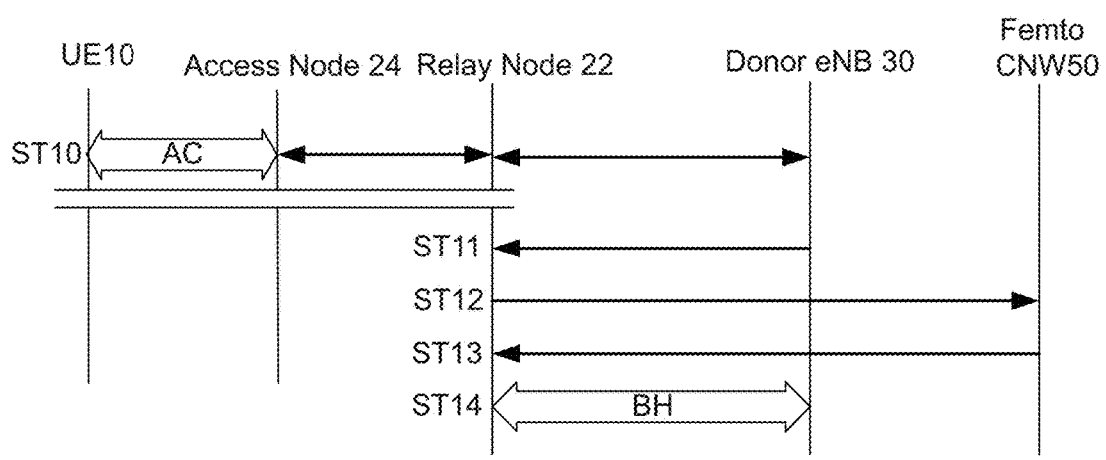
FIG. 3 is a sequence diagram of normal operation of the relay apparatus.

FIG. 3 is a sequence diagram of normal operation of the relay apparatus. Referring to FIG. 3, when the terminal device 10 which performs only VVifi communication with the access node 24 of the relay apparatus 20 exists in the service area, a VVifi session is generated and access communication (AC) is executed between the terminal device 10 and the access node 24 of the relay apparatus 20 (ST10).

When the relay apparatus 20 starts connecting with the donor base station 30, the relay node 22 acquires connection destination identification information from the donor base station 30 (ST11).

The relay node 22 connects with the donor base station 30 on the basis of the connection destination identification information (ST12). When this happens, the relay node 22 transmits a measure report to a femto core network (Femto CNW) 50 that performs failure management, quality management, and activation/stop control management of the relay apparatus 20.

On the other hand, the femto core network 50 judges communication quality, communication traffic volume, and so on with respect to communication with the relay node 22 on the basis of the measure report from the relay node 22 (ST13). Then, the connection is established between the relay node 22 and the donor base station 30, thereby executing backhaul communication (BH) (ST14).

The femto core network 50 of the donor base station 30 continues to judge the communication quality, communication traffic volume, and so on with respect to the communication with the relay node 22 on the basis of the measure report from the relay node 22.

According to this embodiment, the amplitude and the phase from the antenna elements which are used by the relay node 22 for the uplink Up radio communication with the donor base station 30 are properly selected, high combined reception quality is maintained in the radio communication relating to the backhaul radio, and communication with high communication quality and at preferred communication speeds can be ensured.

(Principles of Beamforming by Array Antennas)

In the first embodiment, an array antenna in which a plurality of antenna elements are arrayed and which is designed to control the amplitude and phase of excitations of each antenna element independently is adopted as the antenna 21. Furthermore, for example, an adaptive array system which performs adaptive control of directivity characteristics of the array antenna is adopted as the beam adjuster 28.

Now, principles of beamforming by the array antenna will be explained by referring to literature on "Foundations of Array Antennas" (written by Nobuyoshi Kikuma, Department of Computer Science and Engineering, Graduate School of Engineering, Nagoya Institute of Technology) about the principles of the adaptive array system.

Figure 8:
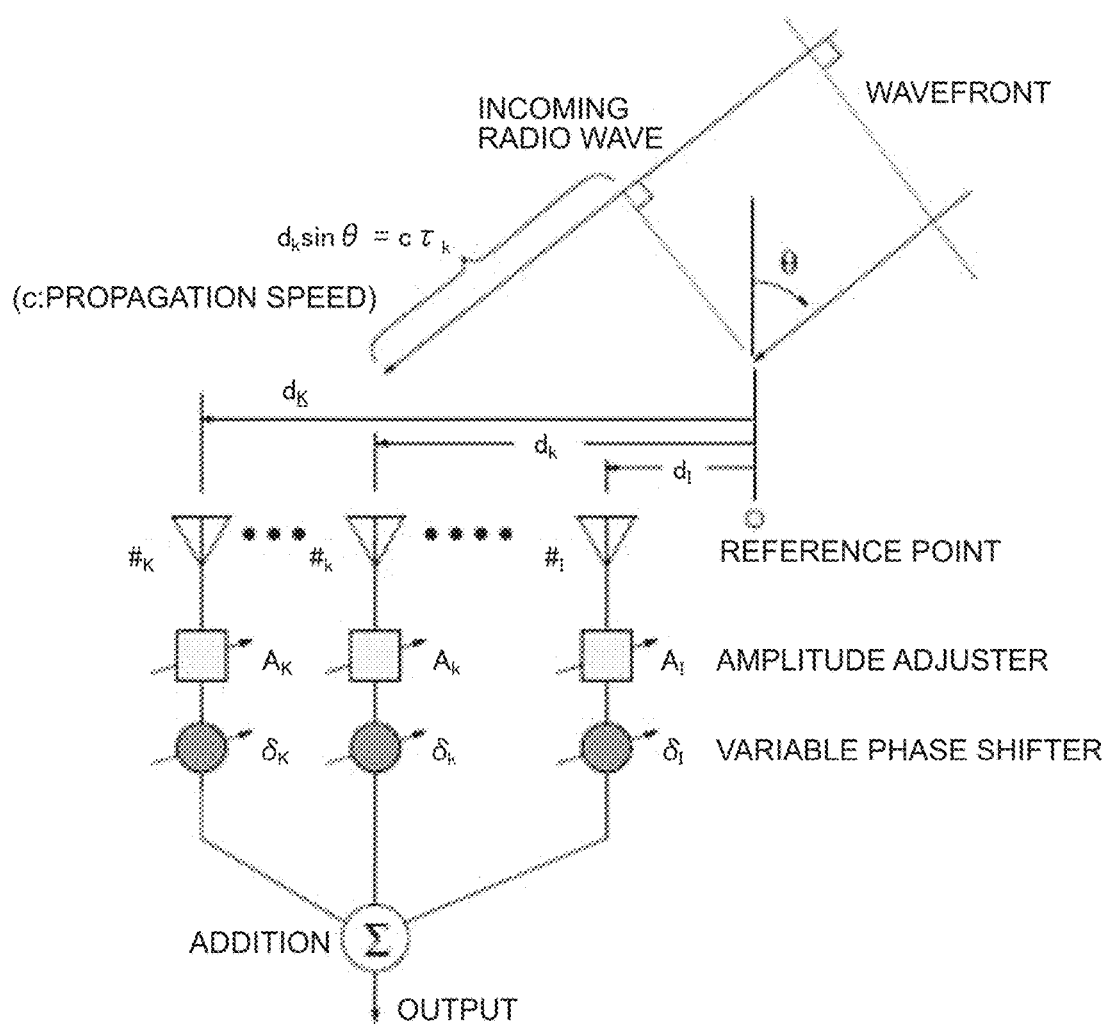
FIG. 8 is an explanatory diagram of a K-element linear antenna.

Various arrays such as a linear array, a flat plane array, or a curved plane array are possible as a method for arraying the antenna elements to configure the array antenna; however, in the following explanation, a linear array composed of K pieces of identical antenna elements as illustrated in FIG. 8 will be considered in order to understand basic principles.

Let us assume that one radio wave has arrived from a direction of angle θ as measured from a broadside. When $E_o$ represents an incoming signal at a reference point on a base line, g(θ) represents a directivity function of the antenna elements, and the incoming signal has a narrow band relative to the array, a voltage induced at a k-th antenna element can be calculated according to Expression (1) below.

[Math. 1]

$$E_k = E_0 g(\theta) \exp\left(-j\frac{2\pi}{\lambda} d_k \sin\theta\right) \quad (1)$$
$$(k = 1, 2, \ldots, K)$$

[Math. 2]

$$E_{sum} = E_0 g(\theta) D(\theta) \quad (2)$$

[Math. 3]

$$D(\theta) = \sum_{k=1}^{K} A_k \exp\left\{j\left(-\frac{2\pi}{\lambda} d_k \sin\theta + \delta_k\right)\right\} \quad (3)$$

In the above expression, $A_k$ and $\delta_k$ are weight and phase-shift quantity, which are multiplied by the k-th element, respectively. Moreover, D(θ) represents an array factor. Referring to Expression (2), directivity of the array is expressed by a product obtained by multiplying the element directivity g(θ) by the array factor D(θ). This is called the law of pattern multiplication. Therefore, when all the antenna elements are the same and are positioned in the same direction, the directivity of the entire array can be adjusted effectively by controlling the array factor.

For example, when an attempt is made to maximize the size of the array factor in a certain angle $\theta_o$, generally the phase-shift quantity $\delta_k$ is selected as follows.

[Math. 4]

$$\delta_k = \frac{2\pi}{\lambda} d_k \sin\theta_o \quad (4)$$

Specifically speaking, it is designed so that phases of outputs from a phase shifter regarding a desired signal become identical to each other with respect to the respective elements. The phases of outputs from the respective elements do not become identical to each other in directions other than the above-mentioned direction and are offset from each other to some degree. If the array antenna is used in the above-described manner, gain for the desired signal increases. However, when an element interval is large, the phases become identical to each other and are added even with the angle $\theta_{gm}$ which satisfies Expression (5) below and, therefore, a large array response value is generated.

[Math. 5]

$$-\frac{2\pi}{\lambda} d_k \sin\theta_{gm} + \delta_k = 2m\pi \quad (5)$$
$$(m = \pm 1, \pm 2, \ldots)$$

Figure 9A:
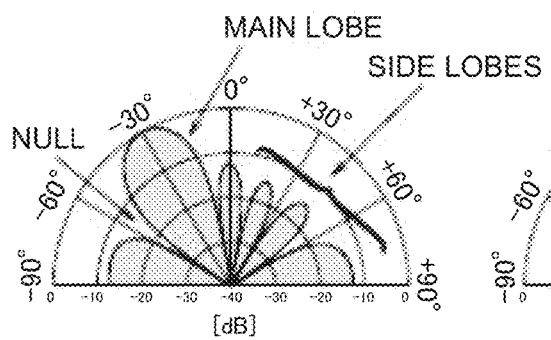
FIG. 9A is an illustration of a directivity pattern of isotropic antenna elements having 6-elements half-wavelength interval.
Figure 9B:
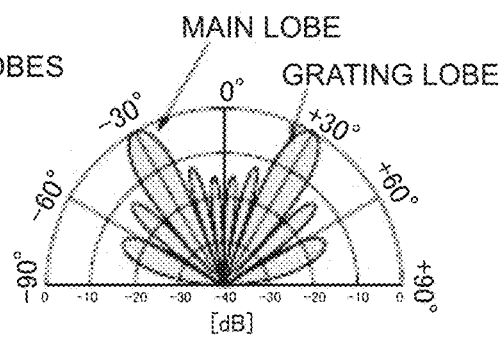
FIG. 9B is an illustration of a directivity pattern of isotropic antenna elements having 6-elements one-wavelength interval.

This is called a grating lobe (see FIG. 9B) and a preventive measure is normally taken in a designing stage. The absolute value |Esum| in Expression (2) which is expressed as a function of the angle θ is called a directivity pattern and values around its maximum value are called a main lobe (main beam) (see FIGS. 9A and 9B). There are also many other locally maximum values, but they are called side lobes. Furthermore, a zero point between the lobes is called a null.

If an unnecessary wave source exists in the side lobe direction, a received voltage according to the wave source is induced. If an electric field intensity ratio between the unnecessary wave and the desired signal is larger than an inverse number of a ratio between the side lobe and the main lobe, the signal becomes inferior to the unnecessary wave even at the output end of the antenna system.

When the antenna elements are located at equal intervals, the array factor in Expression (3) takes a homogeneous polynomial form. Consequently, it is possible to select $A_k$ appropriately by using a mathematical means and thereby generally reduce the side lobe or make a response value of the incoming direction become zero with respect to a specific strong unnecessary wave.

However, if that incoming direction is unknown or changes, it is necessary to feed back information obtained from whatever learning and create optimum characteristics. The system based on the above-described ideas is the adaptive array.

(Relay Method)

Figure 4:
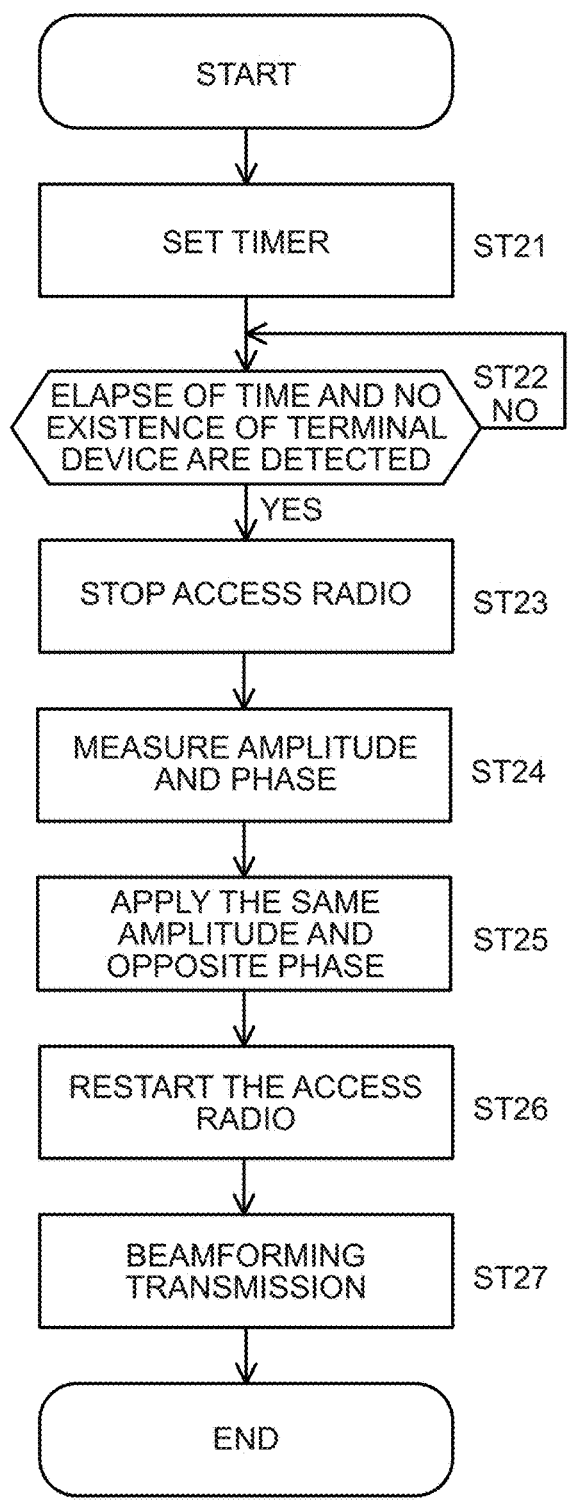
FIG. 4 is a flowchart of a relay method for the relay apparatus according to the first embodiment.
Figure 5:
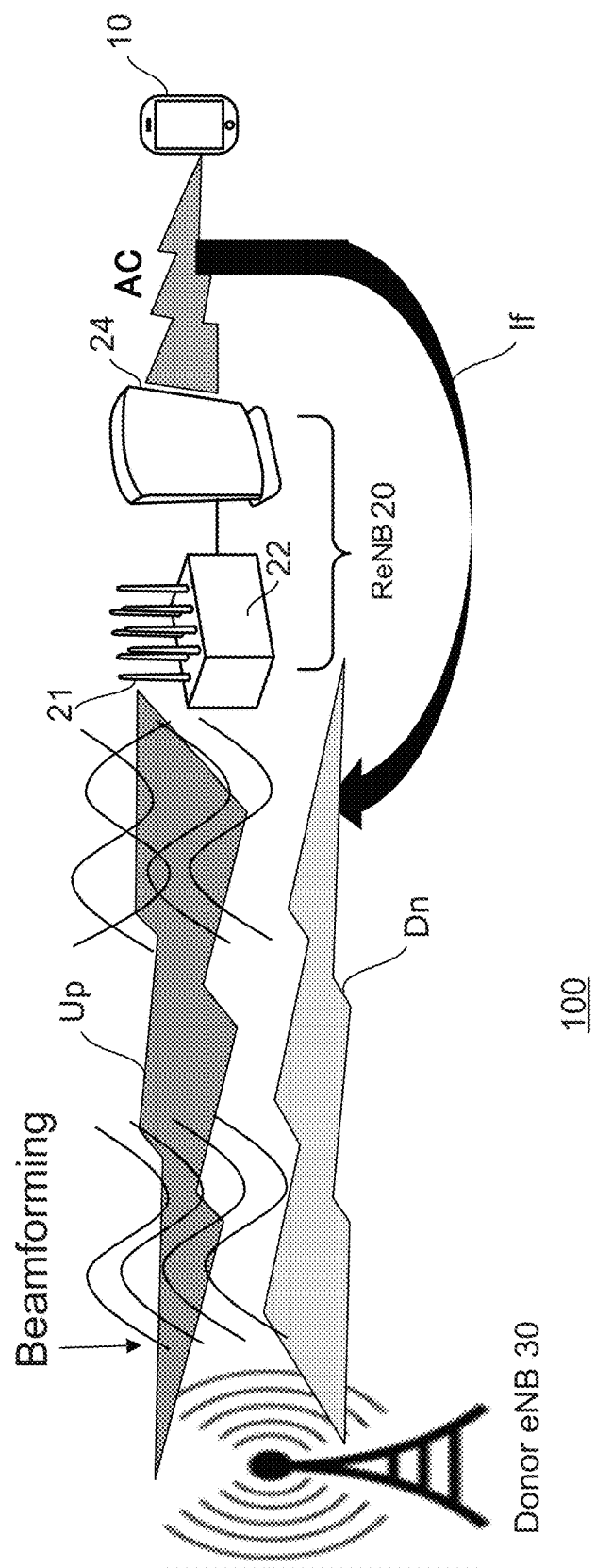
FIG. 5 is an explanatory diagram of faulty measurement of electric field intensity due to existence of a terminal device in a service area.

Next, a relay method for the relay apparatus according to the first embodiment will be explained with reference to FIG. 4 and FIG. 5. FIG. 4 is a flowchart of the relay method for the relay apparatus according to the first embodiment. FIG. 5 is an explanatory diagram of faulty measurement of an amplitude and phase due to operation of the access radio.

It is known, as described earlier, that the radio communication (downlink Dn) from the donor base station 30 to the relay node 22 and the radio communication (uplink Up) from the relay node 22 to the donor base station 30 are routed through the same propagation path.

In this embodiment, the amplitude and phase of the downlink Dn radio communication are measured and the same amplitude as that of the downlink Dn and an opposite phase of the phase of the downlink Dn are used for the uplink Up, thereby performing radio communication of higher combined reception quality.

Under this circumstance, when the access radio of the access node 24 for the relay operation 20 is active as illustrated in FIG. 5 and an attempt is made to adjust a combination of antennas for the uplink Up while measuring the amplitude and phase of the downlink Dn radio communication at the relay node 22, a harmonic wave from the access radio of the access node 24 which is performed at close distance interferes with the downlink Dn radio communication (If). Therefore, the amplitude and phase measurement of the downlink Dn radio communication cannot be performed accurately and the uplink Up beamforming cannot be executed precisely.

So, in the first embodiment, the timer 27 is activated during a time slot when it is presumed that the terminal device 10 does not exist in the service area of the relay apparatus 20; and when it is detected at specified activation time that the terminal device 10 does not exist in the service area, the relay apparatus 20 stops the access radio and operates to execute the beamforming.

Specifically speaking, the activation time of the timer 27 provided in the relay apparatus 20 is firstly set to the time slot during which it is presumed that the terminal device 10 does not exist in the service area of the relay apparatus 20 (ST21) as illustrated in FIG. 4. Regarding such time slot, a time slot during which the terminal device 10 is not used ordinarily, for example, a midnight time slot, can be set uniformly. Furthermore, when the terminal device 10 which can exist in the service area of the relay apparatus 20 can be limited to a specific one, for example, when the relay apparatus 20 is set at an individual's home, but not a public place, time slots during which this specific terminal device 10 is to be used may be set in advance by means of, for example, measurement, and the activation time of the timer 27 may be set to a time slot during which the specific terminal device 10 has the lowest possibility of being used.

The measurement of the amplitude and the phase by the amplitude and phase measurement unit 25 is not performed before the set time of the timer 27 elapses and no existence of the terminal device 10 in the service area is detected (ST22: NO), and until the access radio is stopped.

When the set time of the timer 27 has elapsed and no existence of the terminal device 10 in the service area is detected (ST22: YES), the access radio is stopped (ST23). Next, the measurement of the amplitude and the phase by the amplitude and phase measurement unit 25 is started (ST24). The amplitude and phase measurement unit 25 measures the amplitude and phase of the downlink Dn from the donor base station 30 to the relay node 22. The beam adjuster 28 measures the amplitude and phase of this downlink Dn and adjusts the uplink Up from the plurality of antenna elements to have the same amplitude as the amplitude of the downlink Dn and an opposite phase of the phase of the downlink Dn (ST25). Subsequently, the access radio is restarted (ST26).

As the amplitudes and phases from the plurality of antennas are adjusted (ST25), the relay node 22 can execute beamforming precisely by adjusting the shape of beam of the uplink Up to make the beam focused and transmitting it as a strong radio wave towards the donor base station 30 (ST27).

Regarding the relay apparatus 20 and its relay method according to the first embodiment as described above, no existence of the terminal device 10 in the service area during the time slot in which the terminal device 10 does not exist in the service area is detected by setting the time of the timer, the access radio is stopped, and the amplitude and phase measurement unit 25 measures the amplitude and phase of the downlink Dn from the donor base station 30 to the relay node 22, so that the amplitude and phase of the downlink Dn are measured accurately. Therefore, it is possible to precisely execute the beamforming of the uplink Up from the relay node 22 to the donor base station 30 without being influenced by the harmonic wave from the access radio.

Second Embodiment

Next, the configuration of a relay apparatus according to a second embodiment will be explained. In the first embodiment, the beamforming is executed on the basis of settings by the timer; however, the difference between the first embodiment and the second embodiment is that in the second embodiment, whether the beamforming can be executed or not is judged not on the basis of the timer, but by detecting that the terminal device 10 does not exist in the service area for a certain period of time.

Figure 6:
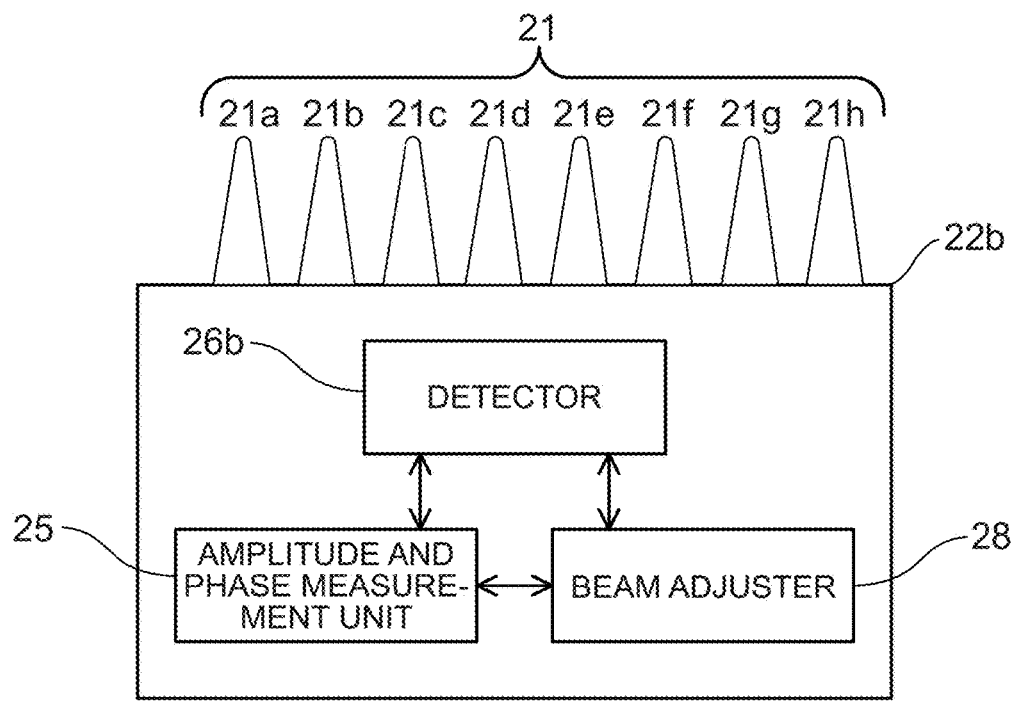
FIG. 6 is a block diagram of a relay apparatus according to a second embodiment.

FIG. 6 is a block diagram of a relay apparatus according to the second embodiment. Incidentally, the same reference numerals as those used in the first embodiment are assigned to constituent elements in FIG. 6 which are similar to those in the first embodiment. Referring to FIG. 6, the difference between the first embodiment and the second embodiment is that a relay node 22b according to the second embodiment does not include a timer, but includes a detector 26b for detecting no existence of the terminal device 10 in a service area of the relay apparatus 20 for a certain period of time. The amplitude and phase measurement unit 25 and the beam adjuster 28 operate in the same manner as those in the first embodiment.

Figure 7:
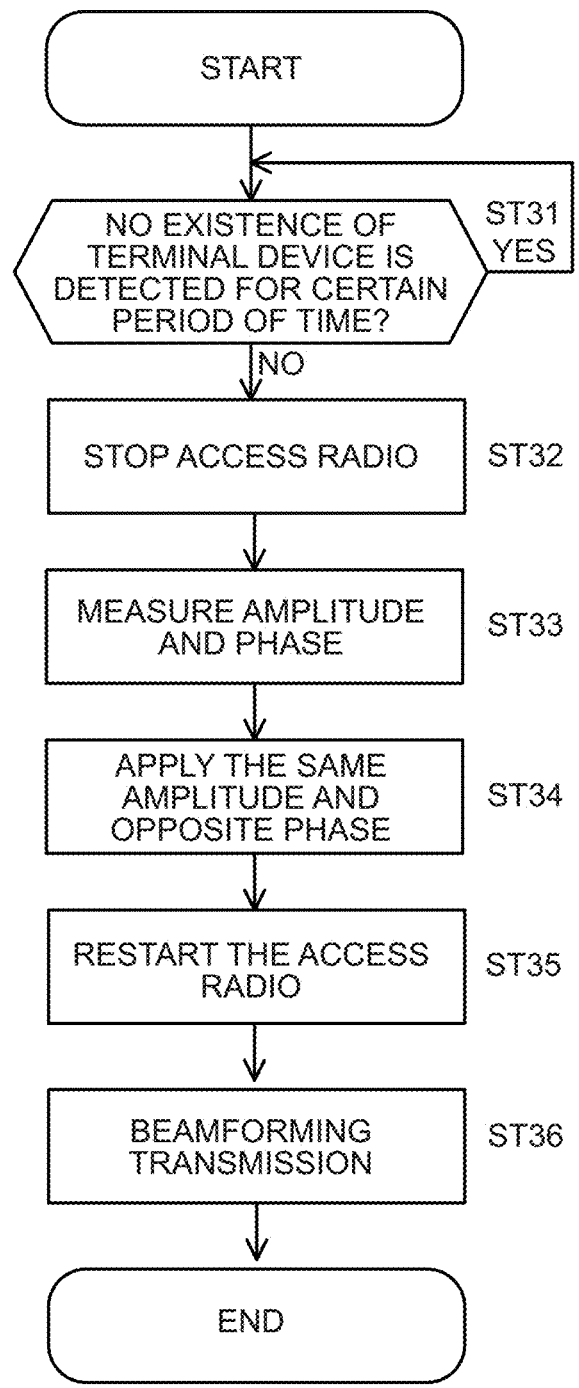
FIG. 7 is a flowchart of a relay method for the relay apparatus according to the second embodiment.

Next, a relay method for a relay apparatus according to the second embodiment will be explained. FIG. 7 is a flowchart of the relay method for the relay apparatus according to the second embodiment.

Referring to FIG. 7, the detector 26b detects whether or not the terminal device 10 exists in the service area of the relay apparatus 20 for a certain period of time (ST31). When the terminal device 10 does not exist in the service area of the relay apparatus 20 for the certain period of time, it can be presumed that the terminal device 10 does not exist around the relay apparatus 20 or the user of the terminal device 10 is in a state unable to operate the terminal device 10. When the detector 26b detects that the terminal device 10 does not exist in the service area (ST31: YES), the access radio is stopped at the access node 24 (ST32).

On the other hand, while the terminal device 10 exists in the service area of the relay apparatus 20 (ST31: NO), the access radio is not stopped and the amplitude and the phase are not measured by the amplitude and phase measurement unit 25.

After the access radio is stopped, the amplitude and phase measurement by the amplitude and phase measurement unit 25 is started (ST33). The amplitude and phase measurement unit 25 measures the amplitude and phase of the downlink Dn from the donor base station 30 to the relay node 22. After the amplitude and phase of this downlink Dn are measured, the beam adjuster 28 adjusts the uplink Up from a plurality of antenna elements to have the same amplitude as the amplitude of the downlink Dn and an opposite phase of the phase of the downlink Dn (ST34). Subsequently, the access radio is restarted (ST35).

As the amplitudes and phases from the plurality of antennas are adjusted (ST34), the relay node 22 can execute the beamforming precisely by adjusting the shape of beam of the uplink Up to make the beam focused and transmitting it as a strong radio wave towards the donor base station 30 (ST36).

Regarding the relay apparatus 20 and its relay method according to the second embodiment as described above, when the detector 26b detects that the terminal device 10 does not exist in the service area of the relay apparatus 20 for a certain period of time, and then the access radio is stopped, the amplitude and phase measurement unit 25 measures the amplitude and phase of the downlink Dn from the donor base station 30 to the relay node 22, thereby preventing the harmonic wave from the access radio from interfering with the radio communication of the downlink Dn. Therefore, it is possible to precisely execute the beamforming of the uplink Up from the relay node 22 to the donor base station 30.

The aforementioned embodiments have been described in detail in order to explain the invention in an easily comprehensible manner and are not intended to interpret the present invention in a limited sense. Each element of the embodiment and its arrangement, materials, conditions, shape, size, and so on are not necessarily limited to those shown in the examples and can be changed as appropriate. Moreover, the configurations illustrated in the different embodiments can be partly replaced or combined with each other.

For example, the relay apparatus 20 according to the aforementioned embodiments has been explained by showing an example of a separated-type apparatus in which the relay node 22 and the access node 24 are separated from each other; however, the relay apparatus 20 may be an integrated-type apparatus in which the relay node 22 and the access node 24 are integrated with each other. In the case of the separated-type apparatus, a plurality of access nodes may be provided for one relay node.

INDUSTRIAL AVAILABILITY

The above-described embodiments have described the systems which adopt LTE as a communications standard for mobile communication. However, the present invention can be applied to other systems having the same object as that of the present invention. Specifically speaking, when an attempt is made to execute the beamforming when the access radio is active at the relay apparatus for relaying communication between the donor base station and the terminal device, the present invention can be applied as long as the relevant system has a problem of a harmonic wave, which occurs in radio communication performed for the access radio at close distance, interfering with radio communication for the backhaul radio. The operation and effect capable of precisely executing the beamforming from the relay apparatus to the donor base station can be expected by applying the relay method according to the present invention.

REFERENCE SIGNS LIST 10 terminal device
20 relay apparatus
22, 22b relay node
24 access node
30 donor base station
100 radio network

The invention claimed is:

1. A relay apparatus for relaying communication between a terminal device and a donor base station,
the relay apparatus comprising:
an amplitude and phase measurement unit that measures an amplitude and phase of radio communication from a donor base station to the relay apparatus; and
a beam adjuster that makes adjustment for beamforming with respect to the donor base station by adjusting amplitudes and phases from a plurality of antennas used at the relay apparatus on the basis of the measured amplitude and phase,
wherein the adjustment for the beamforming with respect to the donor base station is performed by measuring the amplitude and the phase during a time slot when a terminal device does not exist in a service area of the relay apparatus.

2. The relay apparatus according to claim 1,
wherein the relay apparatus includes a timer for activating the amplitude and phase measurement unit and the beam adjuster and the timer is set to be activated during a time slot when it is presumed that a terminal device may not exist in the service area of the relay apparatus.

3. The relay apparatus according to claim 2, wherein after the activation of the timer, the relay apparatus: detects that the terminal device does not exist in the service area; and measures the amplitude and the phase after stopping access radio between the relay apparatus and the terminal device.

4. The relay apparatus according to claim 1,
wherein the relay apparatus includes a detector that detects whether a terminal device exists in the service area or not; and
wherein when the detector detects that the terminal device does not exist in the service area of the relay apparatus for a certain period of time, the relay apparatus measures the amplitude and the phase and makes the adjustment for the beamforming with respect to the donor base station.

5. The relay apparatus according to claim 4, wherein after detecting that the terminal device does not exist in the service area for the certain period of time, the relay apparatus stops access radio between the relay apparatus and the terminal device and then measures the amplitude and the phase.

6. The relay apparatus according to claim 3, wherein the relay apparatus restarts the access radio after making the adjustment for the beamforming.

7. The relay apparatus according to claim 5, wherein the relay apparatus restarts the access radio after making the adjustment for the beamforming.

8. A relay method for a relay apparatus,
the relay method comprising:
a step of measuring an amplitude and phase of radio communication from a donor base station to the relay apparatus; and
a beam adjustment step of making adjustment for beamforming of radio communication from the relay apparatus to the donor base station by adjusting amplitudes and phases from a plurality of antennas used at the relay apparatus on the basis of the measured amplitude and phase,
wherein the relay apparatus makes the adjustment for the beamforming by measuring the amplitude and the phase during a time slot when a terminal device does not exist in a service area of the relay apparatus.

9. The relay method according to claim 8, wherein the relay apparatus makes the adjustment for the beamforming by measuring the amplitude and the phase during a time slot when it is presumed that a terminal device may not exist in the service area of the relay apparatus.

10. The relay method according to claim 8, further including a detection step of detecting whether a terminal device exists in the service area or not, wherein when in the detection step, it is detected that the terminal device does not exist in the service area of the relay apparatus for a certain period of time, the relay apparatus makes the adjustment for the beamforming by measuring the amplitude and the phase.

* * * * *